United States Patent
Kadri et al.

(10) Patent No.: US 10,003,732 B2
(45) Date of Patent: Jun. 19, 2018

(54) DEPTH OF FIELD PROCESSING

(71) Applicant: Foodim Ltd, Borehamwood (GB)

(72) Inventors: Romi Kadri, Cambridge, MA (US); Jim Ingle, London (GB); Neville Kidd, Glasgow (GB)

(73) Assignee: Foodim Ltd, Borehamwood (GB)

(*) Notice: Subject to any disclaimer, the term of this patent is extended or adjusted under 35 U.S.C. 154(b) by 0 days. days.

(21) Appl. No.: 15/053,053

(22) Filed: Feb. 25, 2016

(65) Prior Publication Data
US 2017/0249742 A1  Aug. 31, 2017

(51) Int. Cl.
*G06K 9/00* (2006.01)
*H04N 5/232* (2006.01)
*G06T 5/00* (2006.01)

(52) U.S. Cl.
CPC ......... *H04N 5/23212* (2013.01); *G06T 5/002* (2013.01); *G06T 2200/24* (2013.01); *G06T 2207/10028* (2013.01); *G06T 2207/20012* (2013.01); *G06T 2207/30244* (2013.01)

(58) Field of Classification Search
CPC . H04N 5/23212; G06T 5/002; G06T 2200/24; G06T 2207/20012; G06T 2207/30244; G06T 2207/10028
USPC ...... 382/154, 264, 312; 345/158; 348/222.1, 348/208.2, 180, 187
See application file for complete search history.

(56) References Cited

U.S. PATENT DOCUMENTS

| | | | |
|---|---|---|---|
| 5,534,924 A | 7/1996 | Florant | |
| 6,031,564 A | 2/2000 | Ma et al. | |
| 6,396,535 B1 | 5/2002 | Waters | |
| 8,405,611 B2 * | 3/2013 | Sato | A63F 13/02 345/158 |
| 8,643,741 B2 * | 2/2014 | Brunner | G06K 9/3208 345/158 |
| 8,860,818 B1 * | 10/2014 | Sachs | H04N 5/23216 348/180 |
| 9,025,874 B2 | 5/2015 | Fransson et al. | |
| 9,092,853 B2 * | 7/2015 | Sachs | H04N 5/23216 |
| 9,501,725 B2 * | 11/2016 | Vrcelj | G06K 9/78 |
| 9,652,031 B1 * | 5/2017 | Savastinuk | G06F 3/012 |
| 2004/0218079 A1 | 11/2004 | Stavely et al. | |
| 2007/0206940 A1 * | 9/2007 | Kusaka | G03B 13/28 396/128 |

(Continued)

FOREIGN PATENT DOCUMENTS

CN  101764925 A  6/2010

OTHER PUBLICATIONS

Tomkins, M. (Apr. 16, 2014). Google Camera app for Android adds slightly dubious, Lytro-like refocusing, depth-of-field effects. IR Photo News, Imaging Resource, 6 pgs. Retrieved from http://www.imaging-resource.com/news/2014/04/16/google-camera-app-for-android-slightly-dubious-lytro-like-refocusing-dof.

(Continued)

Primary Examiner — Aaron W Carter
(74) Attorney, Agent, or Firm — Occhiuti & Rohlicek LLP

(57) ABSTRACT

An image processing device for simulating depth of field in a captured image, the image processing device comprising: a camera sensor configured to capture an image; an orientation sensor configured to determine an orientation of the device from which the direction of capture of the image by the camera sensor is derivable; and a processor configured to apply blur to a first area of the captured image in dependence on the orientation of the device.

16 Claims, 3 Drawing Sheets

(56) References Cited

U.S. PATENT DOCUMENTS

| | | |
|---|---|---|
| 2009/0160966 A1 | 6/2009 | Hu |
| 2014/0233853 A1 | 8/2014 | Fransson et al. |
| 2014/0354631 A1 | 12/2014 | Yamaoka |
| 2015/0245020 A1* | 8/2015 | Meier ..................... H04N 7/18 348/135 |
| 2016/0027210 A1 | 1/2016 | The et al. |

OTHER PUBLICATIONS

Invitation to Pay Additional Fees and Partial International Search Report dated May 4, 2017 for International Application No. PCT/GB2017/050488, 14 pgs.

* cited by examiner

DEPTH OF FIELD PROCESSING

BACKGROUND OF THE INVENTION

This invention relates to an image processing system for simulating depth of field in a captured image.

A shallow depth of field can be produced in an image by using a camera lens having a large aperture (typically expressed as a small f-number). Compact digital cameras and digital cameras integrated into smartphones and tablets are, however, not typically equipped with a lens system which is capable of achieving a sufficiently large aperture to produce a shallow depth of field.

Various techniques are described in the prior art for simulating a depth of field effect in a digital camera which is not equipped with a lens system capable of a large enough aperture size to physically produce a shallow depth of field. These techniques rely on digitally post-processing captured images to add a depth of field effect.

For example, U.S. Pat. No. 9,025,874 uses information generated by an autofocus system to form a measure of the relative focal depth of regions defined for a captured image. An amount of blur is then applied to each region according to the difference between the focal depth of that region and the focal distance selected for the captured image by the autofocus system for the region of interest (i.e. the object(s) in the image which it is desired are in focus). Chinese Patent 101764925 describes a similar system. This approach suffers from several problems. If only a limited number of focus regions are defined, each region can itself span a range of focal depths meaning that any blur applied to that region will not be accurate for all of the features in the region. If a large number of focus regions are defined, the processing requirements would be very substantial—although in practice the limiting factor is likely to be the resolution of focus information from the autofocus system, which will normally only provide focus information for a limited number of zones (e.g. no more than 16).

Furthermore, in order to accurately determine a measure of the focal distance for a number of focus regions it is necessary to capture several frames at a range of focal distances. In order to provide a reasonable depth of field effect, such conventional systems will therefore suffer from high latency, substantial image processing requirements and high power consumption. Operating such systems using focus information determined over only a limited number of frames will lead to poor performance and an unrealistic depth of field effect.

Another approach taken in the prior art in order to simulate a depth of field effect is to require the user to indicate a region of the image which is to be in focus. This technique is described in US Patent Application 2009/0160966 in which a blur effect is applied to all regions outside a region selected by the user. The selected region has a predefined shape (e.g. an ellipse). This approach provides an unrealistic depth of field since the same amount of blur is applied to all regions outside the selected region, irrespective of their true focal depth. In the vast majority of cases, the predefined shape of the region which is to be in focus is unlikely to correspond well to the features in the image. The approach only ever provides a rough approximation of depth of field in simple cases where a central object is well spaced in front of a homogenous background (e.g. when taking a photo of a person in front of a landscape).

SUMMARY OF THE INVENTION

According to a first aspect of the present invention there is provided an image processing device for simulating depth of field in a captured image, the image processing device comprising:
 a camera sensor configured to capture an image;
 an orientation sensor configured to determine an orientation of the device from which the direction of capture of the image by the camera sensor is derivable; and
 a processor configured to apply blur to a first area of the captured image in dependence on the orientation of the device.

The orientation sensor may be configured to determine the orientation of the device relative to a predefined axis.

The processor may be configured to derive the direction of capture of the image by the camera sensor and apply blur in dependence on that derived direction of capture of the image.

The processor may be configured to apply blur in dependence on a measure of angle between the orientation of the device and a predefined axis.

The processor may be configured to use the measure of angle between the direction of capture and a predefined axis to determine one or more of: a blur strength; a blur radius; an envelope function defining a variation in blur intensity; a fall-off rate for the applied blur; and an extent of the first area.

The predefined axis may be the direction of acceleration due to gravity.

The processor may be configured to increase the intensity of the applied blur as the angle between the direction of capture and the predefined axis increases.

The processor may be configured to increase the fall-off rate of the applied blur as the angle between the direction of capture and the predefined axis increases.

The processor may be configured to increase the extent of the first area as the angle between the direction of capture and the predefined axis increases.

The processor may be configured to apply maximal blur at an angle between the direction of capture and the predefined axis substantially equal to 90 degrees and to apply minimal blur at an angle substantially equal to 0 degrees.

The image processing device may comprise a user interface and the processor is configured to determine the predefined axis in dependence on one or more inputs received at the user interface.

The image processing device may comprise a user interface and the processor is configured to apply blur to the captured image in dependence on one or more blur parameters selected at the user interface.

The one or more blur parameters may include one or more of: a maximal blur intensity; a blur fall-off rate; an envelope function describing the variation in blur in the first area; and an extent of the first area.

The image processing device may further comprise an autofocus unit configured to determine for the captured image one or more points in focus, and the processor being configured to adjust the extent of the first area in dependence on the location of the one or more points of focus in the captured image.

The processor may be configured to select an extent of the first area such that none of the points of focus lie within a predefined distance of the first area.

The camera sensor may be configured to capture a sequence of images and the processor is configured to process the sequence of captured images and cause the processed images to be presented at a display screen so as to allow variation of blur with orientation of the camera sensor to be observed substantially in real time.

The display screen may comprise a user interface operable to receive an input indicating an extent of the first area on the screen, and the processor is configured to, in response to such an input, adjust the extent of the first area within which blur is applied to subsequent images of the sequence.

The first area may border a peripheral edge of the captured image, and optionally borders the entire length of the peripheral edge.

The extent of the first area in a direction perpendicular to the peripheral edge may be substantially uniform along the peripheral edge so as to represent a band along that edge of the image.

The processor may be configured to apply blur to a second area of the captured image in dependence on a measure of angle between the direction of capture and a predefined axis, the second area bordering the opposing peripheral edge of the captured image to the first area.

The blur may be Gaussian blur applied to the pixels of the captured image.

The orientation sensor may comprise one or more of an accelerometer and gyroscope.

According to a second aspect if the present invention there is provided a method of simulating depth of field in an image captured at an image processing device, the method comprising:
  capturing an image;
  determining an orientation of the device so as to derive a direction of capture of the image; and
  applying blur to a first area of the captured image in dependence on the orientation of the device.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

There is a need for a fast and low power technique for realistically simulating depth of field for a wide range of scenes at a digital camera which is not equipped with a lens system enabling a physical depth of field to be produced.

Figure 1:
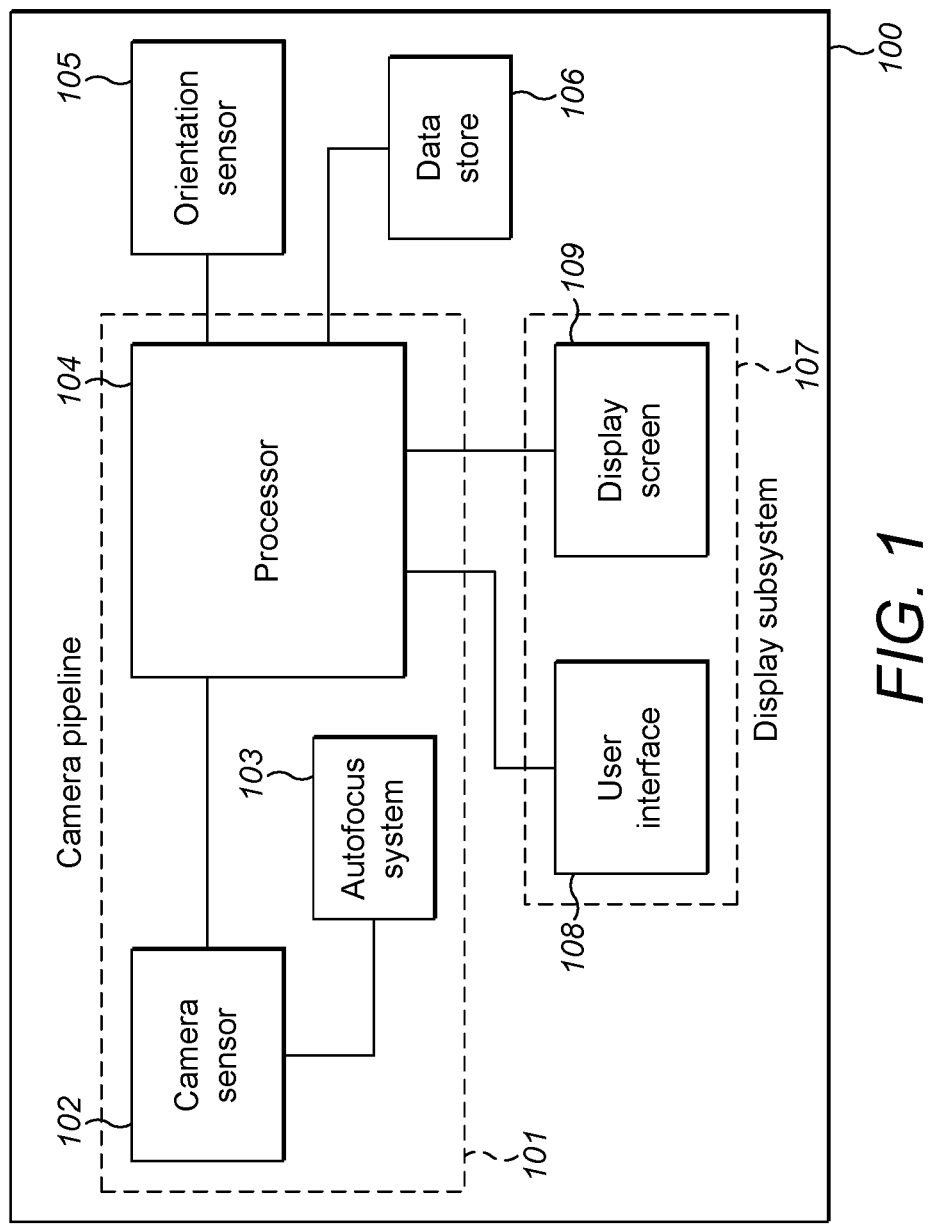
FIG. 1 is a schematic diagram of an image processing device configured in accordance with the present invention.

FIG. 1 shows an image processing device configured to simulate a depth of field effect in a captured image. The image processing device 100 comprises a camera sensor 102, a processor 104 and an orientation sensor 105. The camera sensor and processor may belong to a camera pipeline 101 which could pre-process captured images prior to the application of a blur effect, e.g. by performing automatic control of contrast, white balance, exposure etc. The camera sensor may be considered to include its lens system and may have a fixed aperture size. The orientation sensor is configured to detect the orientation of the device relative to some predefined or selected axis—for example, the axis defined by acceleration due to gravity. The orientation sensor may be any kind of sensor for detecting the orientation of the device—for example, an accelerometer or gyroscope. A gyroscope typically measures angular acceleration and hence allows changes in orientation to be determined relative to some initial known orientation. For example, a relative change in orientation over time may be calculated from a three-axis second integral of angular acceleration with respect to time.

The processor 104 is arranged to process captured images in the manner described herein in dependence on signals from the orientation sensor 105. The processed images may be displayed at a display screen 109 and/or stored at a data store 106. The image processing device 100 may be, for example, a smartphone, compact camera, tablet or other device comprising a digital camera having a lens system with a limited aperture size.

Figure 2:
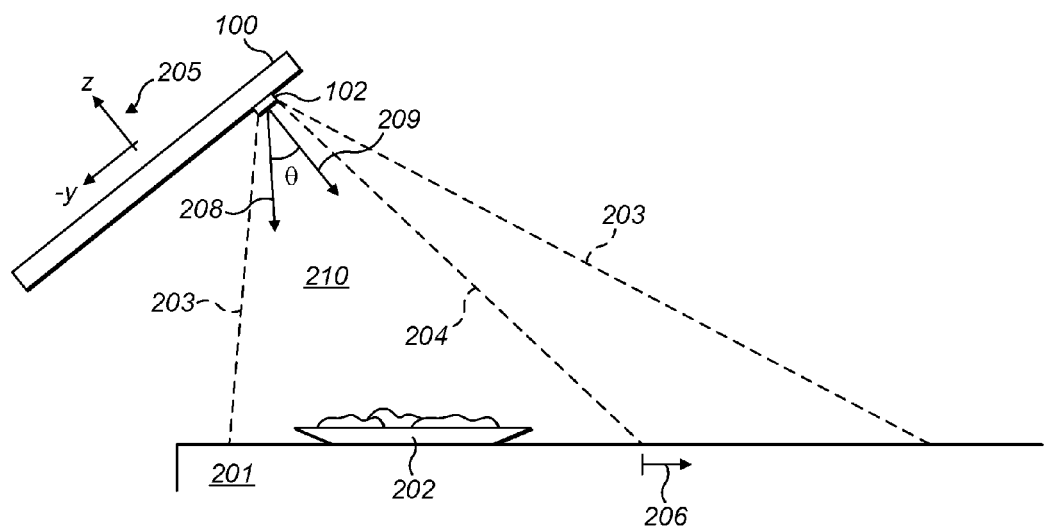
FIG. 2 shows an image processing device capturing an image of an object.

An example of the operation of image processing device 100 will now be described with reference to FIG. 2. In FIG. 2, image processing device 100 is illustrated by way of example capturing an image of an object 202 on a surface 201—e.g. a plate of food on a table. In this example, device 100 is configured to apply a depth of field effect in dependence on the orientation of the device relative to the direction of acceleration due to gravity, g. In other examples, the depth of field effect may be applied in dependence on any other defined axis. This is indicated by vector 208 in the figure. The orientation sensor 105 of the device is arranged to operate with respect to coordinate system 205 in which the z axis is perpendicular to the plane of the device and the y axis is in the plane of the device. Many other coordinate systems are possible and device 100 need not be planar. It will be appreciated that the axis labels x, y and z are merely labels and the principles described herein may be applied with respect to any set of axes, Cartesian or otherwise.

The direction in which camera sensor 102 is configured to capture an image is indicated by vector 209. In this example, the direction of capture of the camera sensor is perpendicular to the plane of the device, along the z axis. In other examples, the direction of capture of the camera sensor may be in any direction relative to the device. In some cases the direction of capture of the camera sensor may be variable—for example, the camera sensor (and potentially just its lens system) may be moveable with respect to the device. It can be advantageous for orientation sensor 105 to be packaged with the camera sensor when the camera sensor is movable relative to the device such that the orientation sensor is configured to measure the orientation of the camera sensor itself relative to a predefined or selected axis. Alternatively, the orientation sensor 105 may be located elsewhere in the device with one or more further sensor elements being provided to determine the orientation of the camera sensor relative to the device: together, the orientation of the device and the relative orientation of the sensor to the device may be used to determine the orientation of the camera sensor relative to the predefined or selected axis.

Lines 203 indicate the field of view of the camera sensor 102. Since object 202 is the subject of the image to be captured, the object in area 210 is to be in sharp focus. Beyond boundary 204, however, blurring of the image would occur were the camera sensor to have a shallow depth of field because those parts of the table in region 206 are at a different focal distance to the plate of food.

Figures 3A, 3B:
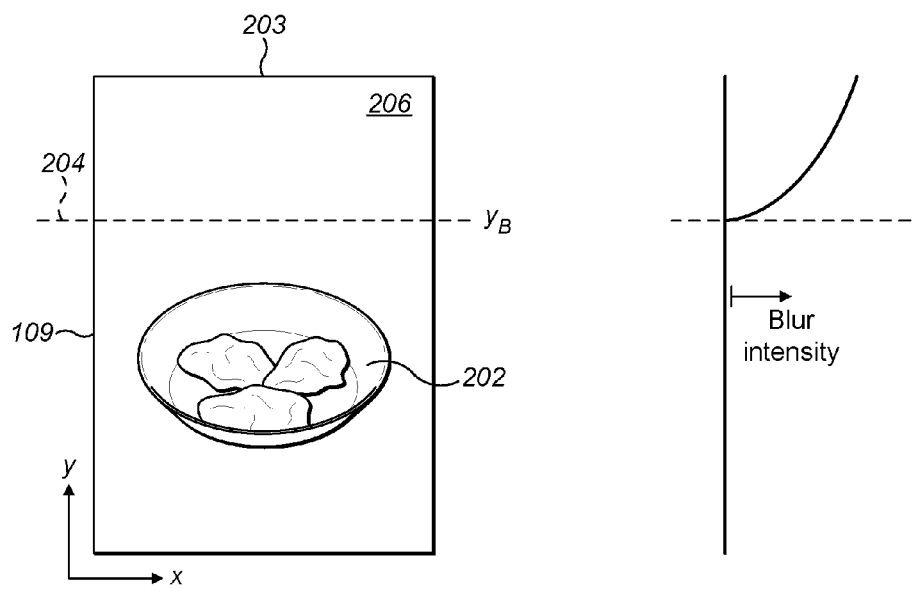
FIG. 3(a) shows an example of the image captured by the image processing device according to the arrangement shown in FIG. 2.
FIG. 3(b) illustrates a possible variation of blur intensity in the blur regions shown in FIG. 3(a).

FIG. 3(a) shows the image captured by device 100 according to the example depicted in FIG. 2. In this example, blur region 206 forms a band adjacent to the top edge of the image, bounded by a blur boundary 204. Generally there may be one or more blur regions. In some embodiments, two bands may be provided, at opposing edges of the image (e.g. top and bottom). The extent of a blur region is the width of that blur region in the y-direction as shown in FIG. 3 (were the device being used in a landscape orientation, it will be appreciated that the x and y axes will be reversed). In other examples, one or more blur regions may have a curved blur boundary with some suitable measure of the extent of the blur regions being defined.

The present invention recognises that a suitable degree of blur to apply to an image in order to simulate shallow depth of field may often be inferred from the orientation of the device—in the present example, its orientation relative to the direction of gravity. In the example shown in FIG. 2, processor 104 is configured to apply a blur to pixels representing region 206 in an image captured by the camera sensor so as to simulate a shallow depth of field. The degree of blur may be controlled for region 206 according to the angle between the direction of acceleration due to gravity and the direction of capture by the camera sensor 102.

The blur applied by processor 104 to the pixels in region 206 varies with the direction of capture by the camera sensor 102 as detected by the orientation sensor 105. One or more characteristics of the blur may be controlled according to a measure of the direction of capture of an image, such as the peak intensity of the blur, the fall-off rate of the blur across a region, and the extent of a blur region. In general, the processor 104 may be configured to control the degree of blur in dependence on any orientation of the device or part of the device (e.g. that part in which the orientation sensor is located) from which the direction of capture of images by the camera sensor can be derived (e.g. by simple trigonometry or vector arithmetic, as is known in the art of electronic sensors for measuring orientation). There may be, for example, a fixed relationship between the orientation of the device and the direction of capture by the camera sensor, there may be some known variable relationship between the direction of capture by the camera sensor, or the orientation sensor may comprise one or more additional sensor elements configured to measure the orientation of the camera sensor relative to the device.

The applied blur could be a function of the angle between a predefined or selected axis and the direction of capture of the camera. The applied blur is preferably maximal when the angle between the axis of acceleration due to gravity and the direction of capture is at or close to 90 degrees and minimal when the angle between the axis of acceleration due to gravity and the direction of capture is at or close to 0 degrees. It can be appropriate for the applied blur to be small when the camera sensor is pointing directly down at object 202 at an angle θ close to zero because in this case the focal distance over the resulting captured image does not vary substantially. The blur due to shallow depth of field would therefore be minimal. It can be appropriate for the applied blur to be large when the camera sensor is oriented so as to capture the object from one side angle θ close to 90 degrees because then the surface 201 on which the object is sitting will appear to recede into the distance—in other words, the focal distance will vary substantially from the in-focus object to any parts of the surface visible behind the object. The blur due to a shallow depth of field would therefore be substantial.

The angle between the axis of acceleration due to gravity and the direction of capture may be limited to 90 degrees such that—with reference to FIG. 2—when the direction of capture is upwards and the indicated angle θ would be greater than 90 degrees, the angle θ is rather measured between the direction of capture and a vector equal and opposite to the acceleration due to gravity. In alternative examples, the angle θ may lie between −180 and +180 degrees with a second order sinusoidal function being used so as to yield an appropriate positive output value. Any other suitable measure of orientation may be used and processed (if required) so as to provide a value in dependence on which blur is determined according to the principles described herein.

The degree of blur applied to a region of an image in dependence on the direction of capture of the camera sensor 102 may be considered to be some combination of one or more of the factors in the following non-exhaustive list:

i. The maximum intensity of the blur in the blur region (e.g. a measure of blur radius). The degree of blur may be considered to be greater when the maximum intensity is greater.
ii. The rate of fall-off of the blur over the blur region—i.e. some measure of the rate at which the blur intensity climbs from a minimum close to the blur boundary to a maximum close to the edge of the image. The rate of fall-off may be a qualitative measure rather than a true measure of rate; it could be a quantitative rate such as an average slope of the fall-off within some predefined distance (e.g. number of pixels) of the relevant blur boundary. Different functions may be used to provide different rates of fall-off. The degree of blur may be considered to be greater when the rate of fall-off is greater (and hence the rate at which the blur intensity climbs from a minimum away from a blur boundary).
iii. The extent of the blur region itself (see below). The degree of blur may be considered to be greater when a blur region is larger.

Thus, a measure of the direction of capture of the camera sensor may be used by processor 104 to control one or more of the maximal intensity of blur applied in a blur region, the rate of fall-off of blur in a blur region from its blur boundary 204 to the edge of the field of view 203, and the extent of the blur region. The particular balance between these factors appropriate to a particular image processing device and its intended application may be determined by trial and error so as to yield the most convincing simulation of shallow depth of field. In some examples, one or more of these factors may be fixed or controlled by the user.

It can be useful to form some measure of the strength of blur applied to an image or blur region. For example, some function of maximal intensity and rate of fall-off may be used as the measure of the strength of blur applied to a region. The strength may be normalised, e.g. a strength of 10 may relate to a high maximal intensity and high rate of fall-off, and a strength of 1 may relate to a low maximal intensity and low rate of fall-off, where "high" and "low" may be empirically determined for the particular hardware and its settings. The rate of fall-off need not monotonically increase with maximal intensity so as to avoid the blur effect appearing artificial at high strengths due the edge of the blur becoming increasingly more well-defined at the same time as the blur effect becomes more intense—for example increasing the strength from 5 to 6 may increase the blur radius of a (e.g. Gaussian) filter but it might not increase the fall-off rate.

A parameter indicating the degree of blur to be applied to a captured image may be formed from a measure of the capture direction of the camera. For example, the angle θ between the direction of gravity 208 and capture direction 209 in FIG. 2 may be used to form a blur factor having some suitable relationship to θ. One such suitable relationship is:

$$\text{blurFactor} \propto \sin^2(\theta)$$

The square of sin(θ) may be used so that blurFactor is always positive. The function $\sin^2(\theta)$ may be implemented using the following identity so as to simplify the processing requirements:

$$\sin^2(\theta) = \frac{1 - \cos(2\theta)}{2}$$

The above blurFactor is zero when the capture direction is parallel to acceleration due to gravity and maximal when the capture direction is perpendicular to acceleration due to gravity.

Any suitable blur function or algorithm may be used. For example, Gaussian blur may be applied by processor 104, with a new value for each pixel or group of pixels in the blurred regions being calculated from a weighted combination of the original value of that/those pixel(s) and the values of its neighbouring pixels according to:

$$G(x, y) = \frac{1}{\sqrt{2\pi\sigma^2}} e^{-\frac{x^2+y^2}{2\sigma^2}}$$

Where x and y represent the position of a pixel in the image. The intensity of the blur applied to a pixel may be controlled by varying the size of the standard deviation, σ, which is an example of a blur radius. A larger standard deviation corresponds to a greater intensity of blur. The blur intensity applied to different pixels of an image can therefore be controlled through modification of the value of a over the blur region. The value of a may vary in dependence on the direction of capture by the camera sensor. For example, the standard deviation may be determined using the above blurFactor so that the degree of blur applied to an image depends on the angle at which the image was captured. Approximations to a Gaussian may be used in order to reduce the burden on processor 104.

In order to provide a realistic blur effect, the blur applied in region 206 may be modulated over the region so that the intensity of blur in areas closer to boundary 204 is lower than the intensity of blur in areas further from boundary 204 (i.e. toward the periphery of the captured frame and the limits of the field of view 203). There is preferably a smooth transition from in-focus region 210 to the out-of-focus region 206 across boundaries 204. The variation of blur intensity in a blur region may be controlled according to a suitable envelope function so as to provide a realistic rate of fall-off of blur as a boundary 204 is approached. Suitable functions could include, for example, a polynomial function, a sinusoidal function, an exponential function, an arctangent, a logarithmic function, or some combination of one or more such functions adapted to reduce the blur in the blur region from a maximum at its frame boundary 203 to a minimum at its blur boundary 204. An example of a logarithmic increase in blur intensity away from blur boundary 204 is shown in FIG. 3(b) for the image depicted in FIG. 3(a). In this example, the blur increases from zero at the blur boundary 204 up to a maximum at the edge 203 of the image.

The blur applied to an image may be further controlled according to the position of the subject pixel(s) in the image so as to achieve a desired fall-off in blur intensity towards a blur boundary. For example, if a Gaussian blur is applied to a captured image, the value of a may be a function of the distance of the position of the subject pixel from the blur boundary of the subject region. For region 206 in FIG. 3(a) where the boundary 204 of blur region 206 is at position $y_B$, the value of σ may be determined according to the relationship:

$$\sigma \propto \log(y - y_B + 1)$$

Approximations to a logarithmic function, or any other suitable function, may be used so as to simplify the processing required at processor 104.

In preferred examples, the blur intensity at a given pixel of a captured image may be a function of both the capture direction of the camera 102 relative to some predefined axis (e.g. acceleration due to gravity) and the position of the pixel relative to the boundary of the blur region (the position of which may itself be a function of the camera orientation).

The extent of a blur region may depend at least partially on the orientation of the camera 102. For instance, in the example shown in FIGS. 2 and 3, the blur region 206 may have a minimal extent (which may be zero) when the capture direction is parallel to the axis of gravitational acceleration and a maximal extent (e.g. some predefined size or proportion of the image, such as 30% of the image) when the capture direction is perpendicular to the axis of gravitational acceleration.

In particularly preferred embodiments it can be advantageous to, as the angle between the capture direction and the acceleration due to gravity increases from 0 degrees, initially primarily increase the extent of the blur region up to some predefined maximum extent (which could be reached at some predefined angle—for example, at around 45 degrees), and, optionally, when that maximum is reached or as it is approached, increase the strength of the blur in the blur region. This approach has been found to provide a good simulation of shallow depth of field with minimal processing requirements. Only one blur region may be provided—this could be a blur region along the upper boundary of the image (e.g. region 206 in FIG. 3(a)).

The blur applied to different blur regions may differ in their relationship to the orientation of the camera and may have different blur characteristics—e.g. different envelope functions, different maximal blur intensities, different maximal extents etc.

Figure 4:
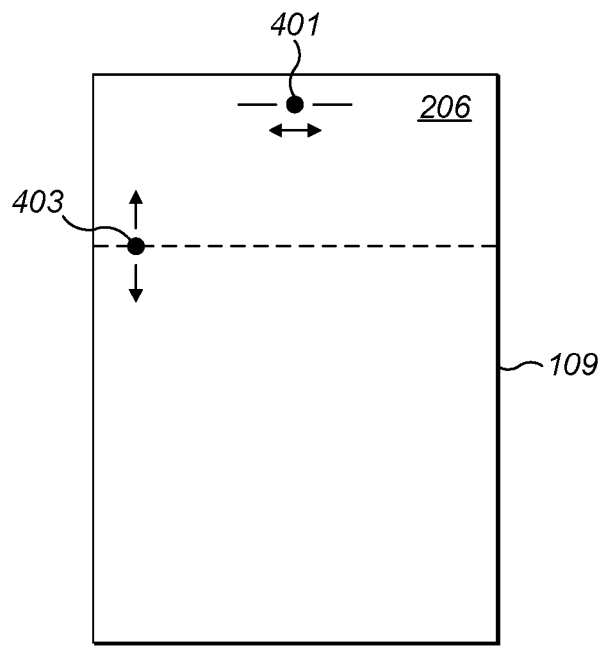
FIG. 4 is an example of a user interface for a display screen of an image processing device.

It can be advantageous to provide the user with some control over the degree of blur to apply to an image. This allows the techniques described herein to be fine-tuned for application to a wide range of scenes. FIG. 4 illustrates an image captured by camera sensor 102 as it may be displayed on a display screen 109 of device 100. In this example, the display screen is integrated with a touch user interface 108. As shown in FIG. 1, the display screen and user interface form part of a display subsystem 107 of the image processing device. Other elements of the user interface could be provided as physical buttons or other controls of the device.

The user may be provided with controls at the user interface to enable the user to control aspects of the blur applied to a captured image. Preferably the processor is configured to overlay controls on the captured image so as to intuitively indicate to the user the effect of the controls. For example, position control 403 may be displayed on the display screen at the blur boundary, enabling the user to drag the blur boundary to the desired position with their finger. The position control may move with the blur boundary so as to provide a convenient graphical depiction of the purpose of the control. Moving a blur boundary to the edge of the display screen may turn off that blur region.

A control to adjust the strength 401 of the applied blur or other characteristics of the blur may also be provided for the user. These controls may be located at or close to their respective blur region so as to readily indicate to the user which blur region they relate to.

It is preferred that the processor 104 is configured to display on the display screen 109 the processed images to which blur has been applied according to the current blur settings and the orientation of the camera 102. The processor may be configured to cause the camera to capture a sequence of images, the processor then processing the captured image to apply blur to simulate a shallow depth of field and cause the images to be displayed on the screen This enables the user to appreciate the effect on the depth of field effect of (a) moving the camera and (b) using the controls presented to them on the display screen.

Figure 5:
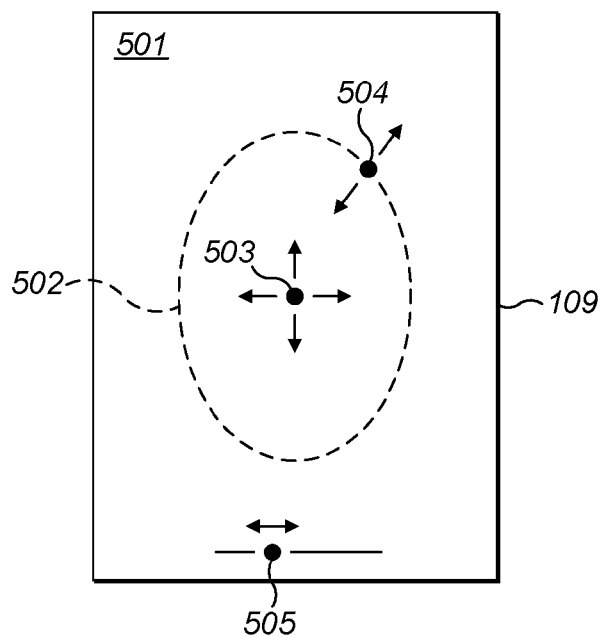
FIG. 5 is an example of a user interface for a display screen of an image processing device.

The one or more blur regions applied to a captured image by the processor need not be in the form of a band along one edge of the image and may take any suitable form. For example, FIG. 5 shows a blur region 501 which extends from all edges of the image up to an elliptically-shaped blur boundary 502. The user may be provided at the display screen with one or more of: (a) a control 503 to allow the user to move the elliptical boundary; (b) a control 504 to allow the user to resize the elliptical boundary; and (c) a control to adjust the maximal strength of the blur applied to the blur region.

It may be advantageous to enable the user to switch between different forms of blur region so as to allow the user to select the most appropriate form of blur region for a given scene.

In implementations where an autofocus system 103 is available (e.g. in camera pipeline 103), it can be advantageous to configure the processor to define the extent of one or more blur regions according to focus information provided by the autofocus system. For example, the processor could be configured to position the one or more blur boundaries such that none of the image features which are reported as being close to or in focus lie within the blur region. The processor may be configured to locate the blur boundaries at least some predefined or calculated distance from any image points considered in focus by the autofocus system.

The user may be able to control the extent of a blur region by indicating by means of the user interface one or more areas which are to be in focus. For example, the user interface may be configured to allow the user to draw an area on the screen to which blur is not to be applied. For example, the user interface may allow a user to draw a closed boundary line around an area on the display screen (e.g. a roughly circular or elliptical shape) which the user desires to be in focus. The processor may, in response to such input, adjust the extent of one or more blur regions so as to not overlap with the indicated area.

The processor may be configured to store one or more processed images at a data store 106—e.g. on a user tapping a shutter control on touchscreen 108. The image stored may be a higher resolution version of the latest image processed according to the current camera orientation and displayed on the screen. The processor may be configured to perform lower latency and quality processing (though with equivalent or analogous settings) for the images presented to the user on the screen than for the images committed to the data store (which may be at a higher resolution than the images displayed on the display screen).

A particular example of the user of image processing device 100 will now be described with respect to the figures.

Consider the arrangement in FIG. 2 in which device 100 is a smartphone and the object 202 to be photographed is a plate of food on a table. The user activates an app on the smartphone which accesses the integrated camera 102 of the smartphone and presents an image of the captured scene on its display screen 109. The camera has a fixed small aperture size and hence a deep depth of field. The image is processed by routines of the app running at the smartphone's processor 104 so as to apply blur in the manner described herein—default settings may be used initially along with a measure of the orientation of the camera relative to the direction of acceleration due to gravity. The smartphone captures new frames at some predetermined interval, processing at least some of those frames and displaying the processed frames on the display screen.

As the user moves the smartphone about in order to frame the plate of food, the orientation of the camera changes and hence the strength of the blur applied in region 206 varies: as the user tilts the smartphone so as to increase the angle θ between acceleration due to gravity and the direction of capture by the camera, the strength of the blur increases so as to simulate the exaggerated effect of a shallow depth of field at oblique angles. The user observes these changes on the display screen.

The user is presented with the controls shown in FIG. 4 which overlay the captured and processed images. The user may shift the blur boundary 204 by dragging the control 403 on the screen, and may choose to adjust strength control 401 so as to achieve a realistic shallow depth of field effect. The user then taps a trigger control button to cause the latest captured image to be processed at its full resolution and at high quality, and stored at data store 106.

The above-described approach to simulating depth of field provides excellent performance when taking photographs of people and objects (e.g. plants, animals, still life subjects) which are very often taken against a background that recedes into the distance behind the person/object and in the foreground projects towards the camera. This is because people/objects are typically arranged on a planar surface, such as the ground, a table, a platform, etc. In these examples, the direction of acceleration due to gravity is generally perpendicular to the planar surface on which the subjects are arranged. The approach to simulating shallow depth of field described herein is particularly advantageous for use in food photography where depth of field effects can provide a professional appearance to photos.

Generally, the axis with respect to which the direction of capture by the camera sensor is assessed need not be the direction of acceleration due to gravity. Any other axis could be defined by the user or received from another sensor at the image processing device, the direction of capture being compared to that axis and the comparison used to determine the degree of blur to be applied to a captured image. For example, a magnetometer may be used to provide an indication of an axis with respect to which blur processing is to be performed. The processor may be operable to present to the user an interface whereby they can orient the device along some desired axis and tap a control to save that axis as the axis relative to which the direction of capture is to be compared. With an appropriate choice of orientation sensor (e.g. a multi-axis accelerometer), such an axis could take any orientation, including being horizontal. This can be useful to enable artistic blur effects to be created in a manner which can be controlled by the user through control of the orientation of the device.

The image processing device may comprise an "app" running at the processor of a smartphone, the app having access to the camera pipeline of the smartphone, an orientation sensor, and a display subsystem of the smartphone.

The image processing device of FIG. 1 is shown as comprising a number of functional blocks. This is schematic only and is not intended to define a strict division between different logic elements of such entities. Each functional block may be provided in any suitable manner. It is to be understood that intermediate values described herein as being formed by an image processing device need not be physically generated by the image processing device at any point and may merely represent logical values which conveniently describe the processing performed by the image processing device between its input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. An image processing device for simulating depth of field in a captured image, the image processing device comprising:
   a camera sensor configured to capture an image;
   an orientation sensor configured to determine, relative to a predefined axis, an orientation of the device from which a direction of capture of the image by the camera sensor is derivable; and
   a processor configured to apply blur to a first area of the captured image in dependence on the orientation of the device and to increase a fall-off rate of the applied blur as an angle between the direction of capture and the predefined axis increases;
   wherein the predefined axis is a direction of acceleration due to gravity.

2. An image processing device as claimed in claim 1, wherein the processor is configured to derive the direction of capture of the image by the camera sensor.

3. An image processing device as claimed in claim 1, wherein the processor is configured to apply the blur in dependence on a measure of angle between the orientation of the device and the predefined axis.

4. An image processing device as claimed in claim 1, wherein the processor is configured to use the angle between the direction of capture and the predefined axis to determine one or more of: a blur strength; a blur radius; an envelope function defining a variation in blur intensity; the fall-off rate for the applied blur; and an extent of the first area.

5. An image processing device as claimed in claim 1, wherein the processor is configured to increase the intensity of the applied blur as the angle between the direction of capture and the predefined axis increases.

6. An image processing device as claimed in claim 1, wherein the processor is configured to increase the extent of the first area as the angle between the direction of capture and the predefined axis increases.

7. An image processing device as claimed in claim 1, wherein the processor is configured to apply maximal blur at an angle between the direction of capture and the predefined axis substantially equal to 90 degrees and to apply minimal blur at an angle substantially equal to 0 degrees.

8. An image processing device as claimed in claim 1, wherein the image processing device comprises a user interface and the processor is configured to determine the predefined axis in dependence on one or more inputs received at the user interface.

9. An image processing device as claimed in claim 1, wherein the image processing device comprises a user interface and the processor is configured to apply blur to the captured image in dependence on one or more blur parameters selected at the user interface.

10. An image processing device as claimed in claim 9, wherein the one or more blur parameters include one or more of: a maximal blur intensity; the blur fall-off rate; an envelope function describing the variation in blur in the first area; and an extent of the first area.

11. An image processing device as claimed in claim 1, wherein the camera sensor is configured to capture a sequence of images and the processor is configured to process the sequence of captured images and cause the processed images to be presented at a display screen so as to allow variation of blur with orientation of the camera sensor to be observed substantially in real time.

12. An image processing device as claimed in claim 11, wherein the display screen comprises a user interface operable to receive an input indicating an extent of the first area on the screen, and the processor is configured to, in response to such an input, adjust the extent of the first area within which blur is applied to subsequent images of the sequence.

13. An image processing device as claimed in claim 1, wherein the first area borders a peripheral edge of the captured image, and optionally borders the entire length of the peripheral edge.

14. An image processing device as claimed in claim 13, wherein the extent of the first area in a direction perpendicular to the peripheral edge is substantially uniform along the peripheral edge so as to represent a band along that edge of the image.

15. An image processing device as claimed in claim 1, wherein the processor is configured to apply blur to a second area of the captured image in dependence on a measure of angle between the direction of capture and the predefined axis, the second area bordering the opposing peripheral edge of the captured image to the first area.

16. A method of simulating depth of field in an image captured at an image processing device, the method comprising:
  capturing an image;
  determining, relative to a predefined axis, an orientation of the device so as to derive a direction of capture of the image; and
  applying blur to a first area of the captured image in dependence on the orientation of the device, with a fall-off rate of the applied blur increasing as an angle between the direction of capture and the predefined axis increases;
  wherein the predefined axis is a direction of acceleration due to gravity.

* * * * *